Sept. 10, 1963   E. F. RUSSELL   3,103,605
WATER-COOLED EDDY CURRENT COUPLING
Filed Sept. 1, 1961   3 Sheets-Sheet 1

INVENTOR.
EDGAR F. RUSSELL
BY Robert H Montgomery
ATTORNEY

Sept. 10, 1963 E. F. RUSSELL 3,103,605
WATER-COOLED EDDY CURRENT COUPLING
Filed Sept. 1, 1961 3 Sheets-Sheet 3

INVENTOR.
EDGAR F. RUSSELL
BY *Robert H. Montgomery*
ATTORNEY

United States Patent Office 3,103,605
Patented Sept. 10, 1963

3,103,605
WATER-COOLED EDDY CURRENT COUPLING
Edgar F. Russell, Erie, Pa., assignor to General Electric Company, a corporation of New York
Filed Sept. 1, 1961, Ser. No. 135,632
8 Claims. (Cl. 310—105)

This invention relates to eddy current couplings, and more particularly to liquid-cooled eddy current couplings.

An eddy current coupling, which is a torque-transmitting device, comprises a magnetic flux-producing member, an eddy current member, and a magnetic pole-providing member which acts as a flux-concentrating member. Inasmuch as an eddy current coupling is a torque-transmitter, the output torque is essentially equal to the input torque. The power output at the output shaft is proportional to the product of load torque and speed, the power input to the input shaft is proportional to the product of the input torque and input speed, and the difference between power input and output is absorbed by the coupling and appears as heating of the eddy current member.

In some eddy current couplings, the flux-producing and flux-concentrating members are integral, in which case this flux member usually comprises an excitation coil-carrying member with pole-forming teeth thereon and an overlying eddy current member in the form of a drum. In this construction the field member is rotated and is commonly referred to as a rotating field coupling. Such construction is exemplified in U.S. Patent 2,334,976. A more common construction at this time is one wherein the flux-producing member is stationary and the coupling shafts carry a flux-concentrating pole member and an eddy current drum, which is the type illustrated in disclosing the present invention.

In both of the aforementioned constructions, the surface of the eddy current drum adjacent the flux-concentrating poles has eddy currents generated therein by the flux concentrations passing therethrough, and these eddy currents produce considerable heat in the drum, particularly when the relative speed of rotation between the drum and the flux-concentrating member increases.

In applications requiring eddy current couplings of high horsepower rating, and also where an eddy current coupling is used in a contaminated environment, it is common practice to utilize an enclosed liquid-cooled machine.

This invention is particularly concerned with a liquid-cooled coupling and is disclosed in a stationary field coupling wherein the field is the outer member, the eddy current drum is the intermediate member, and a flux-concentrating member comprising a rotor having pole-forming teeth therein is within the eddy current drum. In such a construction, concentrations or magnetic flux are produced on the inner drum surface adjacent the rotor teeth. These flux concentrations produce eddy currents near the inner surface of the drum which generate considerable heat in the inner surface of the drum. Some of this heat is conducted to the outer surface of the drum and may be removed by liquid-cooling the outside of the drum. In some eddy current couplings it may be sufficient to remove heat from the drum only at the outer surface thereof. However, in high horsepower couplings, particularly those that operate over a wide speed range, it becomes necessary, in order to operate efficiently, to remove heat from the drum at the inside surface of the drum.

This is usually accomplished by passing a liquid over the inside surface of the drum. However, control of the thickness of a layer of liquid on the inner surface of the drum becomes a major concern. For efficiency of operation, the magnetic gap defined by the drum and rotor teeth should be small in radial dimension; this gap is often referred to as the working gap of a stationary field eddy current coupling. If too much cooling liquid is introduced into the inner surface of the drum, the rotor teeth are likely to become immersed in the liquid and/or cause undesirable cavitation or turbulence of the liquid which produces a "dragging" effect on the rotor teeth, and hence the rotor. This dragging effect produces an undesirable and uncontrollable component of torque on the output member. If the rotor comprises a solid core portion with pole-forming teeth extending radially therefrom and defining recesses therebetween, the cooling liquid may move from recess to recess, resulting in surges of liquid movement and uneven distribution of liquid, and turbulence thereof may produce modulations upon the speed of rotation of the rotor and a further drag upon the rotor.

This invention provides an eddy current coupling which efficiently controls the transmission to and introduction of liquid onto the internal surface of an eddy current drum in a smooth, thin layer to greatly minimize or eliminate water drag on the rotor. The invention further, more generally, provides an improved water-cooling system for an eddy current coupling.

Accordingly, it is an object of this invention to provide an improved eddy current coupling structure for introducing and controlling cooling liquid flow over the inner surface of an eddy current drum.

It is a further object of this invention to provide an improved arrangement for transmitting cooling liquid to the inner surface of an eddy current drum.

It is a still further object of this invention to provide an improved eddy current coupling drum structure for a water-cooled eddy current coupling.

It is another object of this invention to provide an improved liquid-cooled eddy current coupling.

Briefly stated, the invention in one form thereof comprises, an eddy current coupling having a stationary field structure carried by the machine housing, a poled rotor and an intermediate drum member. The drum member support means at either end of the drum carries annular liquid trough means, and the drum support means has metering openings therein adjacent the inner surface of the drum. The drum defines liquid discharge apertures therein intermediate the ends thereof. Liquid conduit means are provided on the machine end housing members. Cooling liquid for both the working and non-working gaps of the coupling is introduced into the machine through a header mounted atop the machine, and the cooling liquid is transmitted through the conduits to the trough means and metered into the inner surface of the drum. The cooling liquid may also be allowed to flow through the iron of the field structure onto the outer surface of the drum. Means are further provided for collecting and discharging the cooling liquid from the coupling housing.

The features of the invention which are believed to be novel are defined with particularity in the claims appended to and forming a part of this specification. However, the invention, together with further objects and advantages thereof, may be most easily understood by reference to the following description when taken in connection with the following drawings wherein:

FIGURE 4 is a view taken along line 4—4 of FIGURE 3; and

Figure 1:
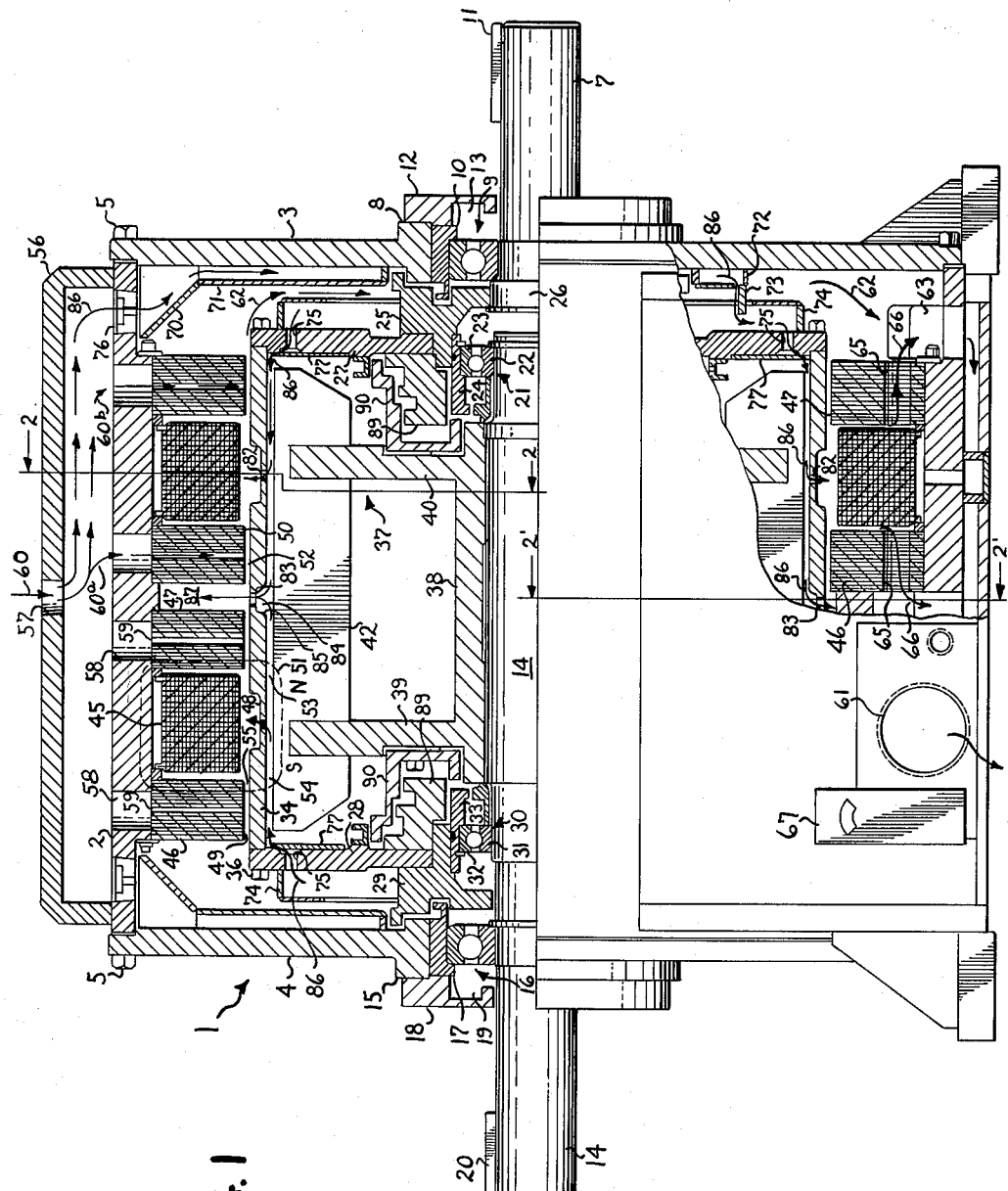
FIGURE 1 is an elevation, partly in section, of an eddy current coupling embodying the invention.
Figure 2:
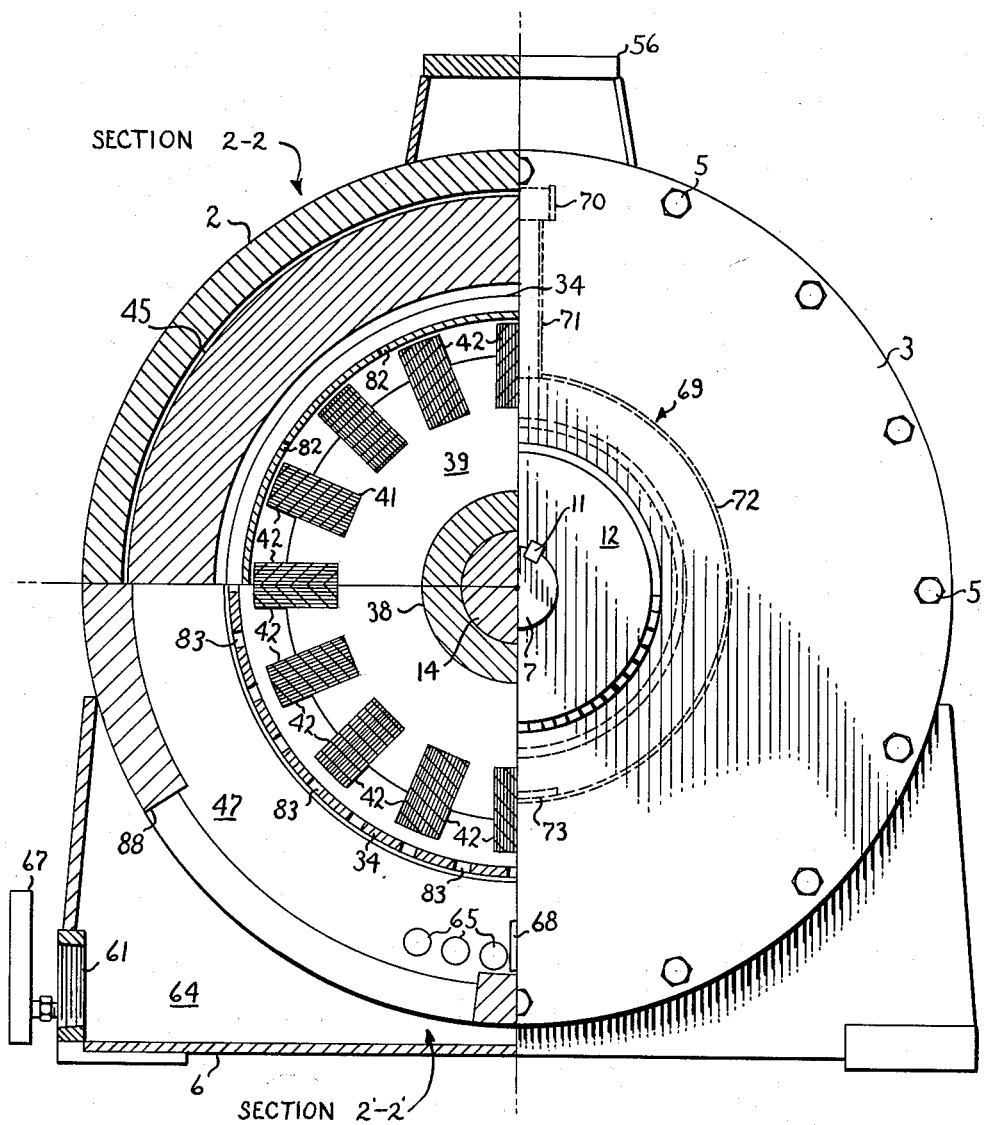
FIGURE 2 is an end view, partly in section, of FIGURE 1.

Reference is now made to FIGS. 1 and 2 which illustrate an eddy current coupling comprising a housing member 1 which includes an annular frame member 2 with annular end frames 3 and 4 secured thereto, each by a plurality of bolts 5. The housing member 1 is secured to and supported by a support member 6.

A shaft, normally the driving or input shaft 7, is rotatably supported in a bearing support bracket 8 defined in end frame 3 by a bearing assembly 9. A sealing member 10 may be positioned between bearing assembly 9 and bracket 8 for purposes hereinafter explained. The shaft 7 is adapted, as exemplified by key 11, to be coupled to the shaft of a prime mover, not shown. Member 12 is secured to end frame 3 to help define a lubricant-retaining cavity 13 about bearing assembly 9.

A second shaft, normally the driven or output shaft 14, is rotatably supported in a bearing support bracket 15 defined in end frame 4 by a bearing assembly 16. A sealing member 17, similar to member 10, is also provided between bracket 15 and bearing assembly 16 for purposes hereinafter described. A member 18, similar to member 12, is secured to end frame 4 to help define a lubricant-retaining cavity 19 about bearing assembly 16. A key 20 may be provided in shaft 14 to aid in coupling shaft 14 to a driven load.

The end frames 3 and 4 and associated bearing support brackets, sealing members and cavity-defining members, for economy of manufacture, are made identical.

The shafts 7 and 14 are axially aligned and made mutually self-supporting by means of pilot bearing assembly 21 having an inner race 22 and an outer race 23. Inner race 22 is non-rotatably mounted on shaft 14 for rotation therewith, and outer race 23 is non-rotatably mounted within annular bearing cartridge 24 for rotation therewith. Cartridge 24 defines a lubricant-retaining cavity about bearing assembly 21 and facilitates assembly of the shafts 7 and 14, as disclosed and claimed in the copending application of Guy D. Bradley, Serial No. 71,789, filed November 25, 1960, and assigned to the same assignee as the present invention.

Figure 3:
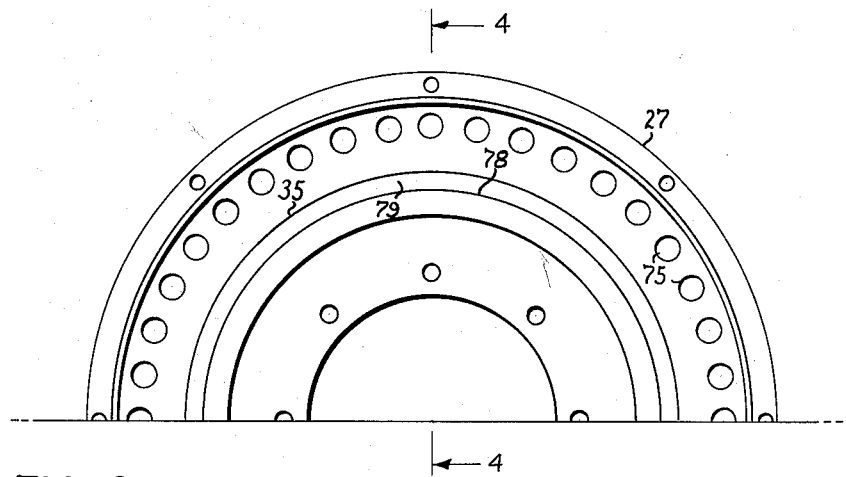
FIGURES 3 and 4 illustrate an eddy current drum support bracket.
Figure 4:
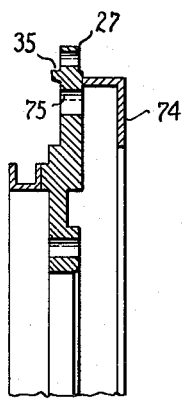

An annular drum support member 25 is secured to portion 26 of input shaft 7 and rotates therewith. The drum support member 25 also rests on bearing assembly 21. Support member 25 has secured thereto annular drum support ring or bracket 27, which is more clearly illustrated in FIGS. 3 and 4. If desired, the support member 25 and bracket 27 may be made integral. A similar drum support ring or bracket 28 is carried on drum support member 29, which in turn is carried on bearing assembly 30. Bearing assembly 30 has an inner race 31 mounted on output shaft 14 and outer race 32 non-rotatably mounted within bearing cartridge 33, upon which the drum support member 29 rests. The bearing cartridge 33 is similar to bearing cartridge 24 at the opposite end of the machine. The inner race 31 rotates with output shaft 14, and outer race 32 rotates with bearing cartridge 33, drum support member 29 and drum support ring 28. Drum support rings 27 and 28 support a generally cylindrical eddy current drum 34 which may be mounted on support rings 27 and 28 by virtue of shoulders 35 (see FIG. 4) and secured thereto by a plurality of bolts 36 at either end thereof. It may thus be seen that the drum 34 is supported on and driveably connected to input shaft 7 at one end of the machine, further supported on output shaft 14 at the opposite end of the machine, and adapted to have relative rotation with output shaft 14. Within the inner periphery of the drum 34 a rotating pole structure 37 is mounted on output shaft 14, preferably by means of a shrink fit between hub portion 38 and shaft 14. The rotating pole structure comprises a hub portion 38 adapted to be secured to the shaft 14 with annular pole-supporting members 39 and 40 extending therefrom. The pole-supporting members have cutouts or slots 41 (FIG. 2) spaced about their periphery to receive and support longitudinally extending pole members 42 therein. The rotating pole structure 37 and pole members 42 are preferably constructed in accordance with the invention of Kenneth R. McDougal, disclosed and claimed in copending application Serial No. 135,633 filed on the same date as this application and assigned to the same assignee as the present invention. The rotor poles are preferably laminated, as illustrated in FIG. 2, to decrease the torque response time upon change of excitation of the exciting field of the coupling, and the pole members 42 are preferably individually formed and supported as disclosed to provide a rotating pole structure of low inertia, as compared with previously used rotating pole structures which comprise a solid core of magnetic material with longitudinal pole-forming teeth extending radially therefrom, defined by longitudinal recesses.

The housing member 2 carries magnetic flux-producing and conducting means, which comprise an exciting coil and a pair of magnetizable pole rings. In the particular machine illustrated, two identical flux-producing and conducting means are utilized. For clarity of illustration, only one flux-producing means together with associated magnetic circuit is described. However, it will be understood that the following discussion is valid for the identical but unidentified (by reference numerals) flux-producing and conducting means and associated magnetic circuit. Each comprises an exciting coil 45 encased in a suitable water-tight casing, not shown, and a pair of magnetic pole-forming rings 46 and 47 on either side of the coil and magnetically coupled to frame member 2. The rings 46 and 47 are preferably laminated for reasons disclosed in the aforementioned copending application, Serial No. 135,633. Leads, not shown, for the coils 45 are brought out to suitable terminals or conduit box, not shown, on the machine housing, and the coils 45 are so electrically connected as to provide proper direction of current flow therethrough when excited. It will be understood that an eddy current coupling utilizing two field coils 45 is shown by way of illustration only. An eddy current coupling employing the invention could utilize only one field coil or more than two field coils, and could also incorporate an eddy current brake. It will be noted that annular grooves 48 are provided in drum 34 beneath each of the coils 45. The grooves 48 provide a restricted area of iron in the drum between the surfaces 49 and 50 of rings 46 and 47 respectively. Therefore, when the coils are excited, the restricted area of iron in the drum 34 between the surfaces 49 and 50 at grooves 48 will saturate at low flux magnitudes and prevent short-circuiting through the drum 34 of magnetic flux set up by the coils. An alternative construction would be to separate the cylindrical drum 34 into axial sections and secure a non-magnetic member, such as a ring of stainless steel, therebetween to magnetically isolate the portions of the drum under the surfaces 49 and 50. When the coils 45 are excited a toroidal flux pattern is set up, as indicated by the dashed lines 51. It will be noted that a magnetic circuit is provided about each coil 45, but described only in conjunction with the left hand coil. Each magnetic circuit comprises a ring 47, gap 52, defined by surface 50 of ring 47 and the outer periphery of drum 34, drum 34, gap 53 defined by the inner periphery of drum 34 and the outer radial edge of a flux-concentrating pole member 42, a portion of the length of pole member 42, gap 54 between drum 34 and pole member 42, drum 34, gap 55 between drum 34 and surface 49, ring 46 and the annular housing 2 of the eddy current coupling.

In operation of the coupling, when the field coils are excited and shaft 7 is rotated to rotate drum 34, magnetic flux will exit from a ring 47, enter drum 34 and be concentrated at the inner surface of drum 34 at pole member 42. Magnetic flux will then travel along a portion of the length of pole member 42 and return to the mating annular ring 46 through drum 34. The flux concentrations entering and leaving the inner surface of drum 34 produce eddy currents therein. The flux entering and leaving the poles form north and south magnetic poles in flux-concentrating poles 42, as indicated by the letters N and S. The interaction between the generated eddy currents and the magnetic poles of pole members 42 cause the pole members 42 to attempt to follow rotation of the drum 34, thereby producing a torque on the pole members 42, and hence the output shaft 14. The degree of magnetic coupling between the drum 34 and poles 42 can be controlled by controlling the excitation of the stationary field coils 45.

The eddy currents generated at the inner surfaces of drum 34 by the flux concentrations passing therethrough produce considerable heating of drum 34, particularly at low speeds of shaft 14, including zero speed when shaft 14 may be called upon to exert a holding torque on a load. At zero speed of shaft 14 essentially all power input to shaft 7 is absorbed by drum 34 as heat.

In accordance with the present invention, improved means are provided for cooling drum 34 as well as coils 45. For simplicity and clarity of illustration, cooling liquid flow is illustrated essentially only in the right hand side of the machine of FIG. 1. However, it will be apparent that the same liquid flow and the structure causing it is duplicated at the left side of the machine of FIG. 1.

A liquid inlet header 56 is mounted on housing 2 and has a water inlet 57 defined therein adapted to be connected to a supply source of cooling liquid, not shown. Apertures 58 are defined in the upper portion of housing 2 which communicate with liquid passages 59 defined in upper portions of field rings 46 and 47. Cooling liquid, as indicated by the arrow 60, flows into header 56 through inlet 57, into each of passages 59 and onto the exterior surface of the drum under all the rings 46 and 47, as illustrated by arrows 60a and 60b. This liquid flow is illustrated only into and through right hand pole ring 46. The passages 59 are defined in the rings only near the top of the housing. The cooling liquid clings to the drum and absorbs heat therefrom until thrown off the drum, when it runs down to the bottom of the machine and is discharged through opening 61 in support member 6. As indicated by arrows 62, some liquid may move axially off the end of the drum. It will be noted that sealing member 10 and drum support member 25 cooperate to form a labyrinth seal to prevent this cooling liquid from entering bearing cavity 13. The liquid, indicated by arrows 62, runs out of the frame 2 through aperture 63 defined therein and into sump 64 defined by support member 6. Likewise, sealing member 17 and drum support member 29 cooperate to form a labyrinth seal to prevent liquid from entering bearing cavity 19. Cooling liquid which is thrown off of the drum will run down the channels defined between the coils 45 and ring members 46 and 47 into sump 64 and out through discharge opening 61. Vent holes 65 are provided in rings 46 and 47 to allow liquid to escape from between mating pole rings, as represented by arrows 66.

In practice, means, as represented by member 67, will be provided to sense the temperature of the discharged coolant and actuate flow and/or pressure controls in a conduit, not shown, leading to header inlet 56.

A liquid deflector 68 may be mounted on rings 46 and 47 at the lower portion thereof to deflect liquid in the channels defined by the pole rings and coils into vents 65.

The structure thus far described provides cooling liquid on the outside of drum 34 which removes heat therefrom. However, since the magnetic flux distribution between smooth surfaces 49 and 50 of pole rings 46 and 47 and drum 34 is essentially constant, essentially no eddy currents are induced in these surfaces and therefore little or no heating due to eddy currents in the outer surface of drum 34 are produced at these surfaces. The magnetic gaps 52 and 55 defined between surfaces 49, 50 and drum 34 are often referred to as non-working or parasitic gaps because they act only as flux conductors, as opposed to the working or flux-concentrating gaps between drum 34 and flux-concentrating pole members 42.

However, some heat generated by eddy currents near the inner surface of drum 34 is conducted through the drum 34 to the outer surface of drum 34, and the liquid introduced onto the outside of the drum serves to remove this conducted heat.

In accordance with the invention, improved means are provided for introducing a controlled flow of cooling liquid onto the interior surface of drum 34.

At each end of the machine, but described with respect to only the right hand end, a liquid conduit 69 (see FIG. 2) is provided on the end frame. The conduit 69, in one form thereof, comprises a fabrication of sheet metal on the machine side of end frame 3 which includes a funnel-shaped section 70, a vertical conduit section 71, a substantially semi-annular conduit section 72 arranged to pass around bearing bracket 8, and a lip or spout 73 arranged to discharge liquid from the conduit means 69 to an annular liquid trough 74 on drum support bracket 27. The drum support bracket 27 is more clearly shown in FIGS. 3 and 4.

The bracket 27 (see FIGS. 3 and 4) comprises an annular member having a plurality of liquid-introducing apertures 75 spaced annularly thereabout adjacent shoulder 35 upon which drum 34 is carried. The annular trough 74 is located on the machine end side of bracket 27 and is arranged to receive liquid from spout 73 at the instantaneously lower portion of bracket 27 for transmittal to the interior of drum 34 through the plurality of apertures 75 defined in preferably circumferential equally spaced relationship in bracket 27 adjacent annular shoulder 35, and having a common radius from the center of bracket 27.

To minimize or eliminate the aforementioned conditions which produce a liquid drag on output shaft 14, liquid must be introduced onto the interior surface of drum 34 in a thin film less than the gap between pole members 42 and drum 34, and caused to move axially across the drum interior surface to remove heat generated therein, and then efficiently removed from the interior of the drum. The amount of liquid introduced into conduit 69 is metered by orifice 76 which provides communication between header 56 and conduit 69.

Figure 5:
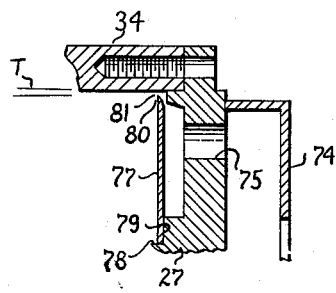
FIGURE 5 illustrates details of the eddy current coupling drum member and liquid metering means.

To control the thickness of the film of liquid on the interior surface of the drum, liquid is metered onto the drum by means of a washer-like metering member 77, see FIG. 5, which is secured near its inner radius to bracket 27 at locating shoulder 78 formed thereon and bracket surface 79. The metering member 77 in one embodiment is secured to surface 79 by means of bolts, not shown.

It will be noted that the metering member 77 has a taper 80 on the outer periphery thereof which defines a gap 81 with shoulder 35 of bracket 27, and the interior surface of drum 34, which meters the amount of liquid passing from trough 74 through openings 75 onto the interior surface of drum 34 and causes it to form into a thin film as it is metered onto the interior surface of drum 34. Centrifugal force acting on the liquid film further compresses the film and causes it to move axially toward the center of the drum 34.

The number of openings 75 in bracket 27 are made sufficient in number to ensure uniform dispersal and distribution of liquid introduced into the drum over the interior surface of the drum. As will be noted most readily in FIG. 5, the openings 75 are closely adjacent the interior surface of drum 34 and the trough 74 extends a sufficient distance past the openings to allow a head of liquid to build up in the trough. The diameter of the openings 75 is chosen such that a head of liquid builds up in the trough 74 to such depth that the openings 75 are completely immersed therein to ensure that each opening 75 has an adequate and uniform supply of liquid. The gap 81 is so dimensioned that the film of cooling liquid introduced onto the interior of the drum 34 is of less dimension than the gap between pole members 42 and drum 34. It is preferred that metering gap 81 be of annular configuration, although other metering means for introducing substantially a circumferentially uninterrupted and uniform film of water onto the tapered surface of the drum 34 may be used.

As a further aspect of the invention, the interior surface of drum 34 is preferably axially tapered from either end toward the center thereof, as illustrated in FIG. 5 by taper T, so that the tangential component of the centrifugal force on the liquid film during rotation of the drum produces a positive pressure on the liquid to move it axially along the interior surface of the drum and avoid any tendency toward piling up of the film. The degree of taper is chosen to provide the desired component of centrifugal force to produce a positive pressure on the liquid and yet not adversely affect electrical torque characteristics of the machine.

To allow discharge of cooling liquid from the interior of the drum, apertures are provided therein intermediate the ends thereof. When an eddy current coupling embodying the invention is constructed with two exciting coils, as illustrated, an annular series of apertures 82 are provided in drum 34 beneath coils 45 and an annular series of discharge apertures 83 are provided at the center of the drum in a groove 84 provided therein. The edges 85 of groove 84 are rounded to provide a smooth transition of liquid flow from axial to radial.

The cooling liquid flow pattern to the interior surface of the drum is now described in conjunction with operation of the coupling. The input shaft 7 is driven by a prime mover most usually at constant speed. When coils 45 are excited, the toroidal flux patterns 51 are generated and magnetic flux follows the paths previously traced. The magnetic flux leaving drum 34, crossing gap 53, entering poles 42 at N, flowing to S and returning to drum 34 across gap 54 is distributed in concentrations by the circumferentially spaced relation of poles 42. The flux concentrations in drum 34, which is of magnetic material, produces eddy currents therein at the interior surfaces thereof which set up localized magnetic fields which are attractive to the magnetic poles formed in poles 42. Therefore, as drum 34 is rotated, the poles 42 attempt to follow such rotation and a driving torque is produced on shaft 14.

Cooling liquid from header 56 flows into conduit 69 through orifices 76 defined in frame member 2 through funnel portion 70, through conduit portions 71 and 72, and over spout 73 which overlies the radially inner edge of trough 74. This liquid flow path is indicated by arrows 86. The liquid is introduced into trough 74 at substantially its lowermost position and centrifugal force on the liquid in trough 74 forms the liquid into an annular band therein. This centrifugal force also exerts a pressure on the liquid in the trough, forcing it through the metering gap 81 onto the interior surface of drum 34. The metering means 77 controls the thickness of the liquid film on the interior drum surface, and the tangential component of the centrifugal force on the liquid film due to the taper of the drum drives the liquid axially along the drum interior surfaces toward the center of the drum from both ends thereof. Some liquid will be discharged through apertures 82 onto field coils 45. The remainder of the liquid flows axially to groove 84 and is discharged through the annular series of apertures 83 defined in the drum in groove 84. The liquid, as it is discharged from the drum, flows in the channels defined by the coils and pole rings to the bottom of the housing and discharges from the machine, as heretofore described. The two innermost pole rings define an annular channel 87. Liquid discharged through apertures 83 is thrown into channel 87 and discharges into sump 64 through cutouts 88, FIG. 2, in frame member 2.

During operation of the coupling, sealing members 89 on drum support bracket 27 and sealing members 90 on pole supports 39 and 40 cooperate to form labyrinth seals about bearing assemblies 21 and 30 to prevent moisture from reaching the bearing assemblies.

The above-described eddy current coupling and drum structure provides an improved and efficient liquid-cooling system, and further provides control of the thickness of the liquid film introduced onto the interior surface of the coupling to eliminate or greatly eliminate liquid drag on the poled rotor.

The invention has been described as embodied in an eddy current coupling of one particular configuration; however, the invention may be embodied in other forms of coupling. For example, it might be utilized in an outside drum, rotating field coupling, or an outside drum stationary coupling wherein the drum is mounted on only one support bracket. In this last-mentioned construction, the cooling liquid would only be introduced at one end of the drum and no discharge apertures would need be placed in the drum intermediate the ends thereof. In some cases, it may not be desired to cool the outside of the drum 34 and the liquid discharged through apertures 82 may be increased as desired to provide adequate cooling of coils 45. In most cases, the cooling liquid utilized in eddy current couplings is water. However, this invention is not limited to use of water as a coolant and other cooling liquid may be employed.

While one embodiment of the invention has been selected for purposes of disclosure and other embodiments briefly described, still other embodiments and modifications of the disclosed invention may occur to those skilled in the art which do not depart from the spirit and scope of the invention. Accordingly, it is intended to cover all embodiments and modifications of the invention and changes in the illustrated embodiment thereof which do not depart from the spirit and scope of the invention.

What is claimed as new and is desired to be secured by Letters Patent of the United States is:

1. An eddy current coupling comprising an annular housing member having end frames secured thereto, axially aligned shafts rotatably supported in said end frames, a stationary excitation member, a cylindrical eddy current drum member, a member providing magnetic poles, said excitation member, said drum member and said pole-providing member being coaxial with said drum member intermediate said excitation member and said pole-providing member, an annular bracket mounting said drum member on one of said shafts for rotation therewith, said pole-providing member being mounted on the other of said shafts for rotation therewith, means for cooling the surface of said drum adjacent said poles comprising annular liquid-receiving trough means on said annular bracket, liquid conduit means for conducting liquid to said trough on said end frame adjacent said annular bracket, apertures in said bracket member near the inner surface of drum providing communication thereto from said trough means, means for metering the amount of liquid passing from said trough means and for directing said liquid in a substantially uniform film onto the inner surface of said drum, and means for allowing liquid introduced into said drum to exit therefrom.

2. The eddy current coupling of claim 1 wherein said means for allowing the introduced liquid to exit from said drum comprises a series of apertures within an annular groove in the interior surface of said drum intermediate the ends thereof and the edges of said groove are rounded to provide smooth transition of axial flow of the liquid to radial flow.

3. An eddy current coupling comprising an annular housing member having end frames secured thereto, axially aligned shafts rotatably supported in said end frame, a stationary excitation member, a cylindrical eddy current drum member, a member providing magnetic poles, said excitation member, said drum member and said pole-providing member being coaxial with said drum member intermediate said excitation member and said pole-providing member, a first annular bracket mounting one end of said drum member on one of said shafts for rotation therewith, a second annular bracket rotatably mounted on the second of said shafts and supporting the second end of said drum, said pole-providing member being mounted on the other of said shafts for rotation therewith, means for cooling the surface of said drum adjacent said poles comprising annular liquid-receiving trough means on said first and second annular brackets, liquid conduit means on said end frames for conducting liquid to said trough means, apertures in each said annular bracket members near the inner surface of said drum providing communication thereto from said trough means, means on each bracket for metering the amount of liquid passing from said trough means into said drum and for directing said liquid in a substantially circumferentially uninterrupted and uniform film onto the inner surface of said drum, and an annular series of apertures defined in said drum intermediate the ends thereof to allow discharge of liquid from said drum, the interior surface of said drum being tapered from the ends thereof toward said annular series of apertures whereby upon rotation of said drum the tangential component of the centrifugal force exerted on the liquid within said drum produces a pressure on the liquid to move it axially across the interior surface of said drum.

4. An eddy current coupling comprising an annular housing member having end frames secured thereto, axially aligned shafts rotatably supported in said end frame, a stationary excitation member, a cylindrical eddy current drum member, a member providing magnetic poles, said excitation member, said drum member and said pole-providing member being coaxial with said drum member intermediate said excitation member and said pole-providing member, a first annular bracket mounting one end of said drum member on one of said shafts for rotation therewith, a second annular bracket rotatably mounted on the second of said shafts and supporting the second end of said drum, said pole-providing member being mounted on the other of said shafts for rotation therewith, means for cooling the surface of said drum adjacent said poles comprising a liquid inlet header mounted on top of said annular housing, annular liquid-receiving trough means on said annular bracket, liquid conduit means on said end frames for conducting liquid to said trough means, an orifice in said annular housing providing communication between said header and each of said conduits to control the amount of liquid introduced into said conduits, apertures in each said annular bracket members near the inner surface of said drum providing communication thereto from said trough means, means on each bracket for metering the amount of liquid passing from said trough means into said drum and for directing said liquid in a substantially circumferentially uninterrupted and uniform film onto the inner surface of said drum, and an annular series of apertures defined in said drum intermediate the ends thereof to allow discharge of liquid from said drum.

5. An eddy current drum assembly comprising annular drum support brackets, a generally cylindrical drum assembly supported at either end thereof by said brackets, an annular liquid-receiving trough on the outboard end of each of said brackets, said brackets having an annular series of apertures therein adjacent the interior surface of said drum providing communication from said trough to the interior of said drum, means for metering liquid from said trough through said apertures and for directing said liquid in the form of a thin film onto the interior surface of said drum, said drum having apertures therein intermediate the ends thereof to allow discharge of water from the interior of the drum.

6. An eddy current coupling comprising a housing member, a shaft rotatably supported in said housing member, a generally cylindrical eddy current drum, an annular drum support bracket secured on said shaft and extending radially therefrom, said drum being mounted at one end thereof on said drum support bracket, an annular liquid-receiving trough on said bracket, means for introducing liquid into said trough, said bracket having an annular series of apertures therein adjacent the interior surface of said drum providing communication from said trough to the interior of said drum, and means for metering liquid through said apertures and for directing said liquid in a substantially uniform film onto the interior surface of said drum.

7. In an eddy current dynamoelectric machine of the type wherein the axially extending, radially directed pole pieces of a rotatable pole-providing member define a working air gap with the internal peripheral surface of a rotatable eddy current drum circumferentially encompassing said pole-providing member, means for cooling the internal peripheral surface of said eddy current drum comprising: an annular supporting member associated with each end of said eddy current drum and having a plurality of annularly spaced apertures therethrough terminating near said inner peripheral surface; annular liquid-receiving means disposed on said annular supporting members; means for conducting liquid to said liquid-receiving means; means for metering the amount of liquid passing through said apertures from said liquid-receiving means; means cooperating with said metering means for directing said liquid in a substantially uniform film onto the internal peripheral surface of said eddy current drum; and means for allowing for the exit of said liquid from said eddy current drum.

8. In an eddy current dynamoelectric machine of the type wherein the axially extending, radially directed pole pieces of a rotatable pole-providing member define a working air gap with the internal peripheral surface of a rotatable eddy current drum circumferentially encompassing said pole-providing member, means for cooling the internal peripheral surface of said eddy current drum comprising: an annular supporting member associated with each end of said eddy current drum and having a plurality of circumferentially spaced apertures therethrough disposed at a common radius with respect to the the center of said supporting member so that said apertures terminate near the internal peripheral surface of said drum; an annular liquid-receiving member disposed on the surface of said supporting member remote from the end of said drum; an annular metering member having an inner and an outer periphery, said metering member being secured at its inner periphery to the surface of said supporting member adjacent the end of said drum and being provided with a taper at its outer periphery which defines a metering passage between said apertures and the internal peripheral surface of said eddy current drum, said metering member being operative to control the amount of liquid passing from said liquid-receiving member through said apertures and to form said liquid into a thin film onto the internal peripheral surface of said eddy current drum; and means for allowing for the exit of the liquid metered into the interior of said drum.

References Cited in the file of this patent

UNITED STATES PATENTS

| | | |
|---|---|---|
| 2,367,636 | Winther | Jan. 16, 1945 |
| 2,419,837 | Hugin | Apr. 25, 1947 |
| 2,864,015 | King | Dec. 9, 1958 |
| 2,871,383 | King | Jan. 27, 1959 |